US010934953B2

(12) United States Patent
Pichler

(10) Patent No.: US 10,934,953 B2
(45) Date of Patent: Mar. 2, 2021

(54) METHOD AND DEVICE FOR CONTROLLING A TANK VENTILATION VALVE CONNECTED VIA TWO FLUSH LINES TO THE INTAKE TRACT OF A TURBOCHARGED INTERNAL COMBUSTION ENGINE

(71) Applicant: Vitesco Technologies GmbH, Hannover (DE)

(72) Inventor: Thomas Pichler, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/645,919

(22) PCT Filed: Sep. 21, 2018

(86) PCT No.: PCT/EP2018/075552
§ 371 (c)(1),
(2) Date: Mar. 10, 2020

(87) PCT Pub. No.: WO2019/057866
PCT Pub. Date: Mar. 28, 2019

(65) Prior Publication Data
US 2020/0277904 A1    Sep. 3, 2020

(30) Foreign Application Priority Data

Sep. 21, 2017 (DE) .................. 10 2017 216 728.9

(51) Int. Cl.
*F02D 41/00* (2006.01)
*F02M 25/08* (2006.01)
(52) U.S. Cl.
CPC ....... *F02D 41/003* (2013.01); *F02D 41/0045* (2013.01); *F02M 25/0836* (2013.01); *F02M 25/0872* (2013.01)

(58) Field of Classification Search
CPC .............. F02D 41/003; F02D 41/0045; F02M 25/0836; F02M 25/0872
(Continued)

(56) References Cited

U.S. PATENT DOCUMENTS 10,060,394 B2   8/2018   Guidi
10,221,784 B2   3/2019   Pursifull et al.
(Continued)

FOREIGN PATENT DOCUMENTS

DE   10 2007 018 232 A1   10/2008
DE   10 2015 206 507 A1   10/2015
(Continued)

OTHER PUBLICATIONS

German Office Action, Application No. 10 2017 216 728.9, 5 pages, dated May 3, 2018.
(Continued)

*Primary Examiner* — Joseph J Dallo
*Assistant Examiner* — Yi-Kai Wang
(74) *Attorney, Agent, or Firm* — Slayden Grubert Beard PLLC

(57) ABSTRACT

Various embodiments include a method for controlling a tank ventilation valve connected to an intake tract of a turbocharged internal combustion engine via two flush lines, wherein each of the two flush lines includes a respective check valve including: checking whether the respective check valves are in a toggling range; and if the respective check valves are in the toggling range, at least partially closing the tank ventilation valve.

13 Claims, 3 Drawing Sheets

(58) Field of Classification Search
USPC .......................................................... 123/518
See application file for complete search history.

(56) References Cited

U.S. PATENT DOCUMENTS

| | | | |
|---|---|---|---|
| 2007/0239330 A1* | 10/2007 | Baumann | F02M 25/0818 |
| | | | 701/33.7 |
| 2008/0264156 A1 | 10/2008 | Streib et al. | 73/114.43 |
| 2013/0104857 A1 | 5/2013 | Schulz | 123/520 |
| 2013/0220282 A1 | 8/2013 | Hadre et al. | 123/520 |
| 2014/0137553 A1* | 5/2014 | Ulrey | F02B 37/186 |
| | | | 60/602 |

FOREIGN PATENT DOCUMENTS

| | | |
|---|---|---|
| DE | 10 2006 016 339 B4 | 2/2017 |
| DE | 11 2015 004 138 T5 | 6/2017 |
| EP | 2 586 640 A2 | 5/2013 |
| JP | 2015-175234 A | 10/2015 |
| WO | 2014/179548 A1 | 11/2014 |
| WO | 2019/057866 A1 | 3/2019 |

OTHER PUBLICATIONS

International Search Report and Written Opinion, Application No. PCT/EP2018/075552, 13 pages, dated Dec. 14, 2018.

* cited by examiner

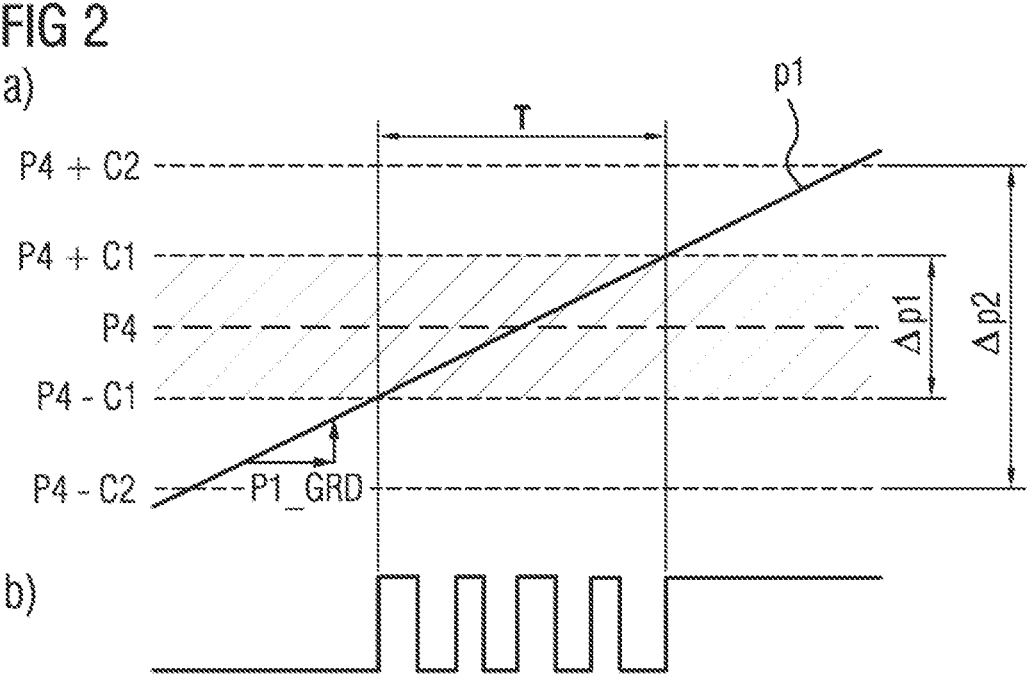
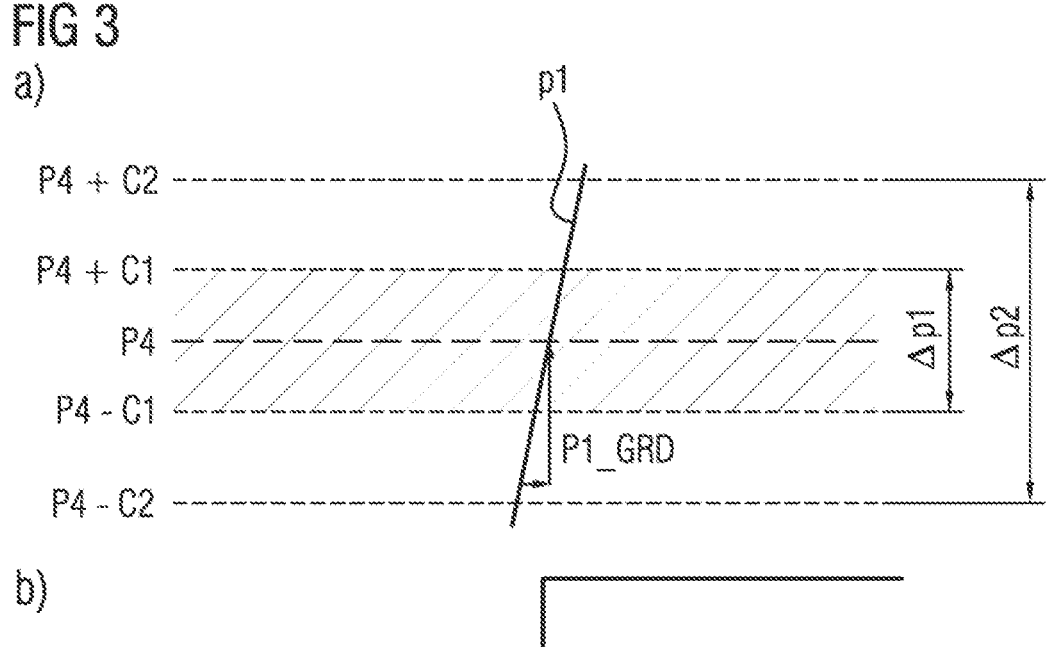

METHOD AND DEVICE FOR CONTROLLING A TANK VENTILATION VALVE CONNECTED VIA TWO FLUSH LINES TO THE INTAKE TRACT OF A TURBOCHARGED INTERNAL COMBUSTION ENGINE

CROSS-REFERENCE TO RELATED APPLICATIONS

This application is a U.S. National Stage Application of International Application No. PCT/EP2018/075552 filed Sep. 21, 2018, which designates the United States of America, and claims priority to DE Application No. 10 2017 216 728.9 filed Sep. 21, 2017, the contents of which are hereby incorporated by reference in their entirety.

TECHNICAL FIELD

The present disclosure relates to internal combustion engines. Various embodiments may include method and/or devices for controlling a tank ventilation valve which is connected via two flush lines to the intake tract of a turbocharged internal combustion engine.

BACKGROUND

DE 10 2006 016 339 B4 describes a method for diagnosing a tank ventilation system of an internal combustion engine and a device for carrying out this method. The tank ventilation system has at least one first ventilation path, which opens downstream of a compressor into the intake region of the internal combustion engine and at least one second ventilation path, which opens upstream of the compressor into the intake region. The other end regions of the ventilation paths are connected via a branching point to a tank ventilation valve which is controlled by a control unit. A check valve is arranged in each of the ventilation paths, which check valve prevents air from the intake region from being able to pass into the tank via the tank ventilation valve. The internal combustion engine can be operated in two different operating states, wherein a first operating state corresponds to naturally aspirated operation and a second operating state corresponds to supercharged operation.

The described division into two ventilation paths enables the tank system to be ventilated during a relatively long period of supercharged operation of the internal combustion engine, in which an intake pipe pressure in the mouth region of the first ventilation path is generally higher than a tank system pressure which is measured in the vicinity of the fuel tank. This has the result that the first check valve is closed. In this case, the second ventilation path provides a tank ventilation facility, which is realized in that, owing to the generally elevated air throughput in the intake region during the supercharged operation of the internal combustion engine, there can be assumed to be a pressure drop upstream of the compressor, which ensures that the intake pipe pressure in the mouth region of the second ventilation path is lower than the tank system pressure. In this way, when the tank ventilation valve is controlled so as to open, the second check valve can open.

SUMMARY

The teachings of the present disclosure describe methods and devices for controlling a tank ventilation valve which is connected via two flush lines to the intake tract of a turbocharged internal combustion engine and in the case of which undesired emissions of the internal combustion engine are reduced. For example, some embodiments include a method for controlling a tank ventilation valve (3) which is connected to the intake tract of a turbocharged internal combustion engine (13) via two flush lines (6, 7), in each of which a check valve (4, 5) is arranged, having the following steps: checking whether the check valves (4, 5) are situated in a toggling range, and partially or fully closing the tank ventilation valve (3) if it is identified that the check valves (4, 5) are situated in the toggling range.

In some embodiments, the checking as to whether the check valves (4, 5) are in the toggling range is carried out by evaluating pressure sensor signals.

In some embodiments, the checking as to whether the check valves (4, 5) are situated in the toggling range is carried out by evaluating pressure sensor signals which are provided by a pressure sensor (S1) which detects the intake pipe pressure at the inlet of the internal combustion engine.

In some embodiments, the checking as to whether the check valves (4, 5) are situated in the toggling range is carried out by evaluating the pressure gradient of the pressure sensor signals which are provided by a pressure sensor (S1) which detects the intake pipe pressure at the inlet of the internal combustion engine.

In some embodiments, if the calculated pressure gradient is smaller than a predefined first threshold value, the presence of the toggling range is identified.

In some embodiments, the predefined first threshold value is an empirically ascertained constant.

In some embodiments, the checking as to whether the check valves (4, 5) are situated in the toggling range is activated if successive pressure sensor signals provided by the pressure sensor (S1) lie within a pressure range which is predefined by a reference pressure (p4) and which deviates from the reference pressure (p4) by less than a predefined second threshold value (C2).

In some embodiments, the predefined second threshold value is an empirically ascertained constant.

In some embodiments, the checking as to whether the check valves (4, 5) are situated in the toggling range is carried out by evaluating pressure sensor signals which are provided by a pressure sensor (S6, S6') which detects the tank system pressure and which is arranged upstream or downstream of the tank ventilation valve (3).

In some embodiments, the checking as to whether the check valves (4, 5) are situated in the toggling range is carried out by evaluating the frequency and the amplitude of the pressure sensor signal (p6, p6').

In some embodiments, the frequency of the intake strokes is determined.

In some embodiments, the presence of the toggling range is identified if the amplitude of the pressure signal (p6, p6') constantly alternately assumes a first or a second value, wherein the first value of the amplitude of the pressure signal is present at the outlet of the first flush line (6) and the second value of the amplitude of the pressure signal is present at the outlet of the second flush line (7).

As another example, some embodiments include a device for controlling a tank ventilation valve (3) which is connected to the intake tract of a turbocharged internal combustion engine via two flush lines (6, 7), which device has an engine controller (14) which is designed for controlling a method as described above.

BRIEF DESCRIPTION OF THE DRAWINGS

Further characteristics of various embodiments of the teachings herein will emerge from the explanation thereof below on the basis of the figures. In the figures:

FIG. 2 shows a first diagram incorporating the teachings of the present disclosure, FIG. 3 shows a second diagram incorporating the teachings of the present disclosure.

DETAILED DESCRIPTION

In some embodiments, a method for controlling a tank ventilation valve which is connected to the intake tract of a turbocharged internal combustion engine via two flush lines, in each of which a check valve is arranged, includes checking whether the check valves are situated in a toggling range, and then, the tank ventilation valve is partially or fully closed if it is identified that the check valves are situated in the toggling range.

In some embodiments, in the event of a detection of the presence of a pressure range in which the check valves have a toggling behavior, the opening state of the tank ventilation valve can be reduced or the tank ventilation valve can be fully closed in order to prevent constantly alternating opening and closing of the check valves (toggling). This prevents a situation in which fluid conducted via the tank ventilation valve is conducted alternately upstream and downstream of the compressor into the intake tract of the internal combustion engine, which would lead to an increase in undesired emissions. Furthermore, this prevents a situation in which the driver of the respective motor vehicle detects instances of noticeable deterioration in driveability as a result of constantly alternating opening and closing of the check valves.

Figure 1:
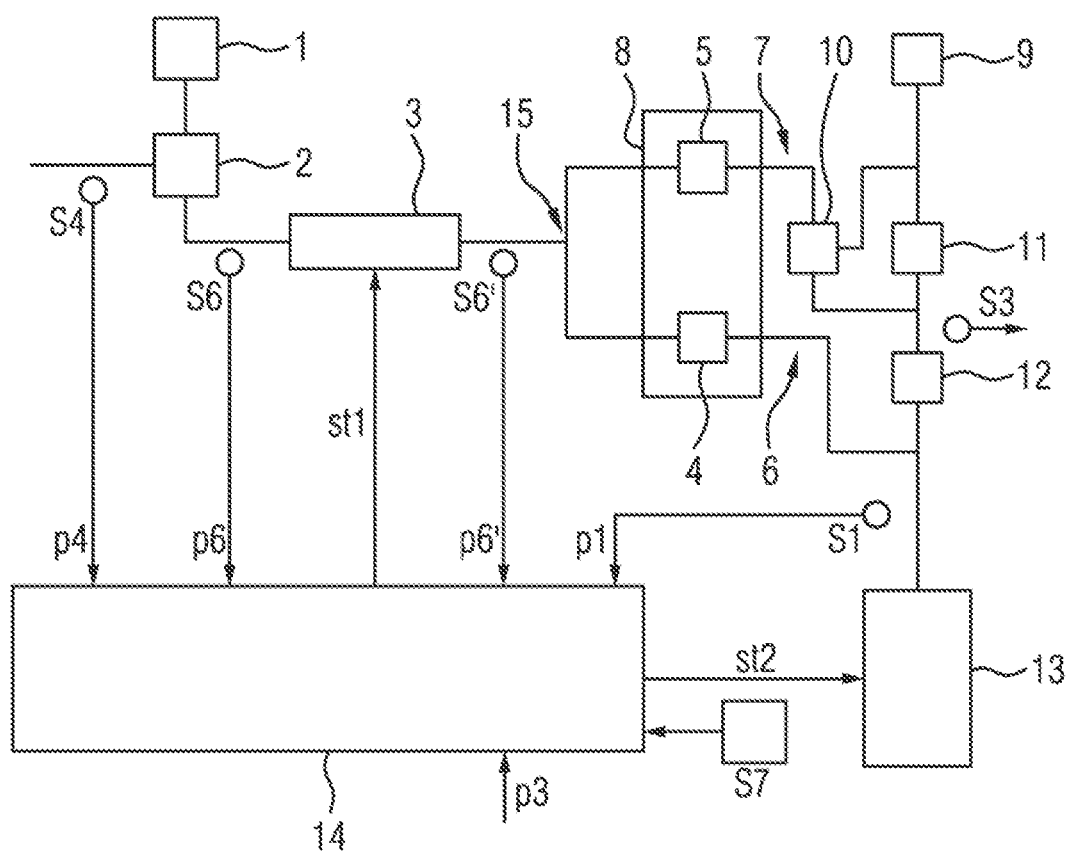
FIG. 1 shows a block diagram for explaining the tank ventilation system of a motor vehicle.

FIG. 1 shows a block diagram for explaining the tank ventilation system of a motor vehicle. In this block diagram, a fuel tank 1 is illustrated which is connected to an activated carbon filter 2. The activated carbon filter is designed to filter out hydrocarbon vapors formed in the fuel tank. For the purposes of ventilating the activated carbon filter 2, the latter is connected via a tank ventilation valve 3 to a branching point 15, via which the fluid for discharging is conducted onward to two check valves 4 and 5 which are arranged parallel to one another and which may be implemented in the form of a double check valve 8.

The first check valve 4 is arranged in a first flush line 6, which extends between the branching point 15 and the intake tract of an internal combustion engine 13, wherein said first flush line 6 opens into the intake tract between a throttle flap 12 and the internal combustion engine 13. The second check valve 5 is arranged in a second flush line 7 which extends between the branching point 15 and the intake tract of the internal combustion engine 13, wherein said second flush line 7 opens into said intake tract via a Venturi nozzle 10. This Venturi nozzle 10 has three connections. One of these connections opens into the intake tract downstream of a compressor 11. Another of the connections is connected to the tank ventilation valve 3 via the second check valve 5. A third connection of the Venturi nozzle 10 opens into the intake tract of the internal combustion engine upstream of the compressor 11 between an air filter 9 and the compressor 11.

In the Venturi nozzle 10, when the tank ventilation valve 3 is open and the second check valve 5 can be passed through by flow, the fluid conducted via the tank ventilation valve 3 is admixed to the air fed to the Venturi nozzle 10 via the air filter 9. The tank ventilation valve 3 is opened by means of a control signal st1, which is provided by an engine controller 14.

The second check valve 5 can be passed through by the fluid conducted via the tank ventilation valve 3 if the tank system pressure p6 or p6' is higher than the air pressure in the Venturi nozzle 10. This is the case, for example, when the turbocharger is active, wherein the fresh air drawn in is compressed by means of the compressor 11 of the turbocharger and fed to the internal combustion engine 13 via the throttle flap 12. In this operating mode, the first check valve 4 arranged in the first flush line 6 prevents a flow of fluid from the intake tract via the tank ventilation valve 3 into the activated carbon filter 2.

The first check valve 4 arranged in the first flush line 6 can be passed through by the fluid conducted via the tank ventilation valve 3 if the tank system pressure p6 or p6' is higher than the air pressure in the intake tract between the throttle flap 12 and the internal combustion engine 13. In this case, the fluid conducted via the open tank ventilation valve 3 is, via the likewise open first check valve 4, admixed downstream of the outlet of the throttle flap 12 to the compressed air fed to the internal combustion engine 13.

Furthermore, pressure sensors S1, S3, S4, S6 and S6' are shown in FIG. 1. The pressure sensor S1 is provided for measuring the pressure in the intake tract between the throttle flap 12 and the internal combustion engine 13 and provides a pressure signal p1 to the engine controller 14. The pressure sensor S3 is provided for measuring the pressure between the compressor 11 and the throttle flap 12 and provides a pressure signal p3 to the engine controller 14. The pressure sensor S4 is provided for measuring the ambient pressure and provides a pressure signal p4 to the engine controller 14. The pressure sensor S6 is arranged between the activated carbon filter 2 and the tank ventilation valve 3 and provides a pressure signal p6 to the engine controller 14. As an alternative to the pressure sensor S6, a pressure sensor S6' may be provided which is arranged between the outlet of the tank ventilation valve 3 and the branching point 15 and which provides a pressure signal p6' to the engine controller 14.

In some embodiments, the engine controller 14 is designed to ascertain the abovementioned control signals st1 for the tank ventilation valve 3 and control signals st2 for the internal combustion engine 13 using stored software, stored empirically ascertained characteristic maps and the stated pressure signals provided by the pressure sensors and further sensor signals. The control signals for the internal combustion engine 13 include, in particular, control signals for the fuel injection valves of the internal combustion engine. The further sensor signals include a sensor signal which is provided by a lambda sensor S7 and which provides information about the residual oxygen content in the exhaust gas of the internal combustion engine.

After all, the tank ventilation system described above has an activated carbon filter 2 in which hydrocarbons outgassed from the fuel tank are bound, an intake tract in which an air filter 9, a Venturi nozzle 10, a compressor 11 and a throttle flap 12 are arranged, two flush lines 6, 7 which are arranged parallel to one another and in each of which a check valve 4, 5 is arranged and which open into the intake tract at different points, a tank ventilation valve which is controlled by the engine controller 14 and which is arranged between the activated carbon filter 2 and the flush lines 6, 7, and an engine controller 14.

In some embodiments, the engine controller is designed to, among other things, use stored software, stored empirically ascertained characteristic maps and measurement signals, provided by sensors, for the respectively present operating point of the internal combustion engine to ascertain a setpoint value for the flushing flow, to ascertain a control signal for the tank ventilation valve, to ascertain a fuel quantity for injection, and to calculate a fuel correction on the basis of the hydrocarbon concentration of the flushing mass flow ascertained by means of a lambda controller deviation and to ascertain delay times associated with the introduction points of the flush lines into the intake tract, which delay times provide information about the period of time that the fluid requires to travel from the tank ventilation valve to an injection element of the internal combustion engine and information about the period of time that the fluid requires to travel from the tank ventilation valve to the lambda probe.

In order to be able to ensure correct calculation of these delay times, the presently opened-up flush line is determined. Furthermore, for an ascertainment of the hydrocarbon concentration of the fluid flow and for the ascertainment of the fuel correction, the switchover time is determined on the basis of present pressure values.

The differential pressures prevailing across the respective introduction points are based on a detection of the point in time at which a switchover is performed between the two flush lines. The following applies to the pressure difference between the environment and the introduction point downstream of the throttle flap:

$$Diff1 = p4 - p1.$$

The following applies to the pressure difference between the environment and the introduction point upstream of the throttle flap:

$$Diff2 = p4 - p_v,$$

wherein the Venturi pressure $p_v$ is dependent on the inlet pressure at the Venturi nozzle 10, to which the following relationship applies:

$$p_v = p2 - p5.$$

Here, p2 is an empirically ascertained or modeled pressure value that is present downstream of the compressor 11, and p5 is a likewise empirically ascertained or modeled pressure value that is present upstream of the compressor 11.

The pressure levels at the two introduction points of the fluid into the intake tract are approximately identical in the presence of a slow charge pressure build-up and also at an engine operating point near the induction-based full load, at which the pressure upstream of the throttle flap is approximately identical to the pressure downstream of the throttle flap. This has the effect that there is no exact switchover time at which the fluid flow is switched over between the two flush lines. Rather, toggling occurs, that is to say alternating switching back and forth between the two flush lines. This in turn results in an undefined opening-up of the introduction points of the two flush lines into the intake tract.

Thus, in the case of the pressure conditions mentioned, it is not possible to correctly calculate the fluid propagation times and the injection correction. In the case of high hydrocarbon concentrations in the fluid flow, correspondingly inaccurate calculations in the tank ventilation function have an adverse effect on the emissions of the vehicle and the driveability of the vehicle. Consequently, there is a need for as exact as possible an ascertainment of the pressure range in which the abovementioned toggling occurs. If this pressure range is known, then an occurrence of toggling can be prevented by means of a reduced flushing rate or full shutting-off of the tank ventilation valve.

In the course of downsizing of motor vehicle engines and the associated increasing supercharging of gasoline engines—in order to be able to comply with the legal regulations regarding hydrocarbon emissions—a quantitatively relevant flushing mass flow must be made possible at engine operating points with supercharging. This is realized, also in the case of relatively small-volume engines, with the aid of a Venturi nozzle or an electrically driven flushing pump. In the previous use of a Venturi nozzle in gasoline engines with a large displacement and corresponding mass flows in the intake tract, the influence of the additional mass flow from the tank ventilation system at the engine operating points mentioned is negligibly low.

In some embodiments, an evaluation of the intake pipe pressure dynamics is used to check whether the check valves are situated in a toggling range. As part of this check, the gradient of the intake pipe pressure ascertained by means of the pressure sensor S1 is determined. For this purpose, two pressure ranges $\Delta p1$ and $\Delta p2$ are specified, which are ascertained empirically. The pressure range $\Delta p1$ is a first pressure range in which the check valves 4 and 5 have a toggling behavior. The pressure range $\Delta p2$ is a second pressure range in which the determination of the gradient of the intake pipe pressure is activated.

The following relationships apply:

$$\Delta p1 = [p4 + C1, p4 - C1],$$

where $\Delta p1$ is the first pressure range, p4 is the ambient pressure and C1 is an empirically ascertained first calibration constant.

$$\Delta p2 = [p4 + C2, p4 - C2],$$

where $\Delta p2$ is the second pressure range, p4 is the ambient pressure and C2 is an empirically ascertained second calibration constant and where C2 is greater than C1.

This is illustrated in FIG. 2, which shows a first diagram incorporating the teachings herein. In FIG. 2a, the pressure p is plotted upwards and the time t is plotted to the right. This FIG. 2a shows in particular the stated pressure ranges $\Delta p1$ and $\Delta p2$. Furthermore, FIG. 2a illustrates a linearly increasing, slow increase in the intake pipe pressure p1, the associated intake pipe pressure gradient p1_GRD and the toggling range T. The associated positions of the check valves are illustrated schematically in FIG. 2b. In particular, it can be seen from FIGS. 2a and 2b that constantly alternating opening and closing of the check valves occurs in the toggling range T.

FIG. 3 shows a second diagram. In FIG. 3a, the pressure p is plotted upwards and the time t is plotted to the right. FIG. 3a also illustrates the stated pressure ranges $\Delta p1$ and $\Delta p2$. Furthermore, FIG. 3a illustrates a linearly running steep increase in the intake pipe pressure p1, and the associated intake pipe pressure gradient p1_GRD. The associated positions of the check valves are illustrated schematically in FIG. 3b. It can be seen that no toggling behavior arises, but rather a one-off, clearly defined switchover between the two flush lines or check valves.

In some embodiments, the intake pipe pressure gradient p1_GRD is calculated within a predefined pressure range $\Delta p2$. If the calculated gradient falls below a predefined threshold value, then it is identified that toggling behavior is present within the pressure range $\Delta p1$, that is to say the check valves are situated in the toggling range. In reaction to this, the tank ventilation valve is partially or fully closed in order to prevent the abovementioned increase in pollutant emissions and the deterioration in driveability.

The stated pressure ranges $\Delta p1$ and $\Delta p2$ are—as already discussed above—ascertained empirically by observation of the pressure in the intake tract for the respective internal combustion engine type taking into consideration the component specifications, in particular the specifications of the Venturi nozzle, of the check valves and of the tank ventilation valve.

If the charge pressure build-up and the associated intake pipe pressure build-up take place with high dynamics, then toggling of the check valves cannot be observed, but a defined, one-off switchover between the check valves occurs. In this case, it is not necessary to "mask" the transition region between the two tank ventilation introduction points. As a result, a reopening of the tank ventilation valve after the departure from the switchover range of the check valves is not necessary, and an increase in the flushing rate is thus possible.

In some embodiments, an evaluation of the output signal p6 of the pressure sensor S6 or, alternatively, an evaluation of the output signal p6' of the pressure sensor S6' is used to check whether the check valves are situated in a toggling range. This second embodiment will be explained in more detail below on the basis of the output signal p6 of the pressure sensor S6. In this second embodiment too, the evaluation takes place in the pressure range $\Delta p2$ defined above. In this second embodiment, the frequency and the amplitude of the pressure signal p6 serve as the detection criterion for the identification of the toggling range.

If the first flush line 6, which opens into the intake tract downstream of the throttle flap 12, has been activated, the frequency of the intake strokes with a period T1 of the individual cylinders of the internal combustion engine can be found again in the pressure signal p6. In addition, the amplitude of the pressure signal p6 changes at the switching time of the check valves. If toggling is present, then a constant change in the amplitude of the pressure signal p6 between the amplitudes of the pressure signal in the region of the two introduction points of the fluid from the tank ventilation system into the intake tract can be observed which does not correspond to the frequency of the intake strokes.

In order to ensure a robust evaluation of the pressure signal p6, the procedure described above can be used without restriction for linear valves and, in the case of permanent energization, for clock valves (switching valves). For explanation of the second embodiment described above, reference is made to FIGS. 4 and 5.

Figure 4:
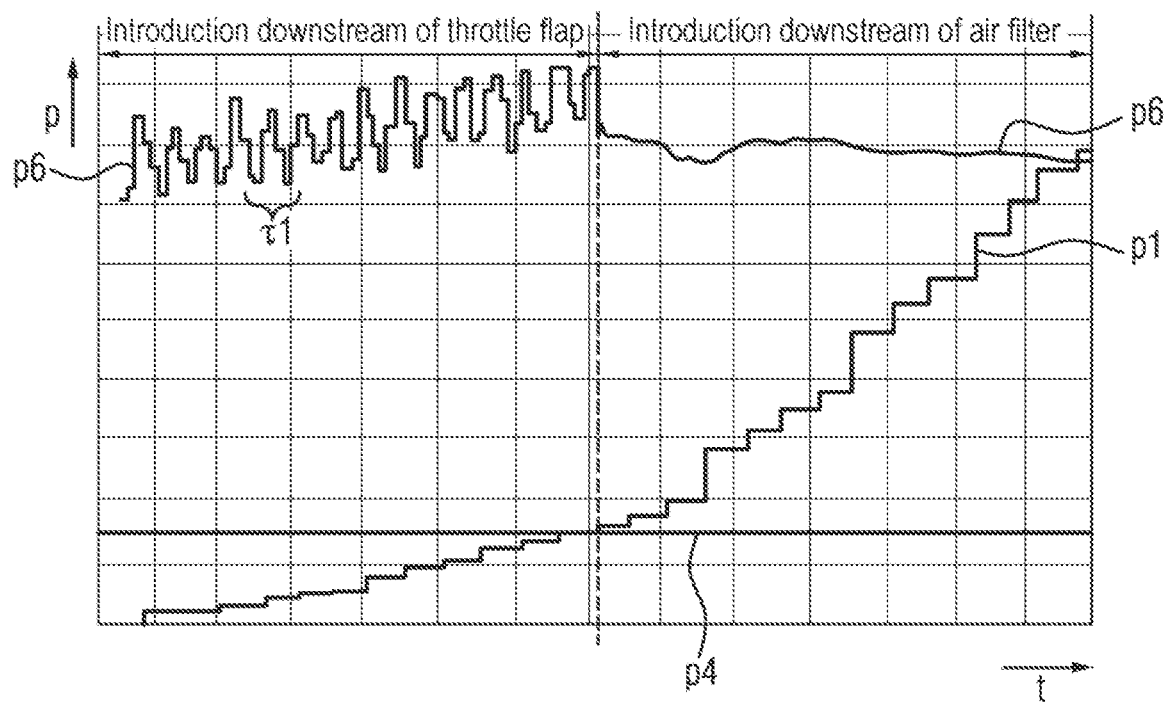
FIG. 4 shows a third diagram incorporating the teachings of the present disclosure.

FIG. 4 shows a third diagram, in which toggling does not occur. In this diagram, the pressure p is plotted upwards and the time t is plotted to the right. A vertically running dashed line is plotted in the middle of this diagram. Signal profiles of p1, p4 and p6 are also illustrated in this diagram. p4 shows the profile of the ambient pressure, the amplitude of which is constant. p1 shows the intake pipe pressure provided by the intake pipe pressure sensor S1, the amplitude of which increases, is lower than the ambient pressure to the left of the vertically running dashed line, intersects the ambient pressure characteristic curve in the region of the vertically running dashed line, and is higher than the ambient pressure to the right of the vertically running dashed line. The vertically running dashed line thus illustrates the switchover time between the two check valves or flush lines.

The intake pipe pressure p1 is lower than the ambient pressure p4 to the left of the vertically running dashed line. Consequently, the second check valve 5 and thus also the second flush line 7 are in the shut-off state, such that the fluid flowing via the tank ventilation valve 3 is introduced through the first check valve 4 and the first flush line 6 into the intake tract downstream of the throttle flap 12 and, there, is admixed to the fluid compressed in the compressor 11 and conducted through the throttle flap 12. The period it of the intake strokes can be seen in the associated profile of the pressure signal p6 shown at the top to the left of the vertical dashed line.

To the right of the vertically running dashed line, the intake pipe pressure p1 is higher than the ambient pressure p4. Consequently, the first check valve and thus also the first flush line 6 are in the shut-off state, such that the fluid flowing via the tank ventilation valve 3 is introduced through the second check valve 5 and the second flush line 7 into the intake tract in the Venturi nozzle 10 and thus upstream of the throttle flap 12 and also upstream of the compressor 11 and, there, is admixed to the air fed via the air filter 9. The profile of the pressure signal p6 illustrated at the top to the right of the vertical dashed line expresses that, owing to the switchover of the check valves, the period of the intake strokes can no longer be identified.

Figure 5:
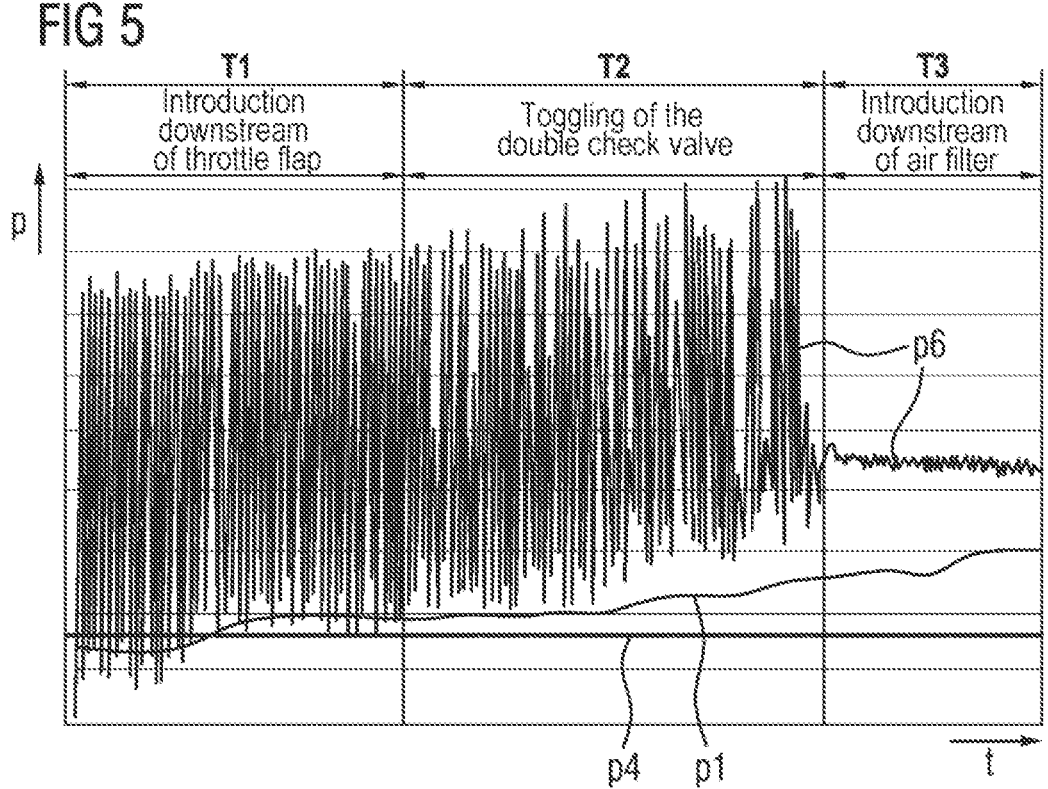
FIG. 5 shows a fourth diagram incorporating the teachings of the present disclosure.

FIG. 5 shows a fourth diagram. In this diagram, too, the pressure p is plotted upwards and the time t is plotted to the right. This diagram illustrates the pressure profiles in the event of toggling occurring. FIG. 5 again illustrates the profiles of the pressure signals p1, p4 and p6. Furthermore, different time periods T1, T2 and T3 are illustrated in FIG. 5. In the time period T1, the fluid conducted via the tank ventilation valve 3 is introduced via the first flush line 6 into the intake tract at an introduction point arranged downstream of the throttle flap. In the time period T3, the fluid conducted via the tank ventilation valve 3 is introduced via the second flush line 7 into the intake tract at an introduction point situated in the Venturi nozzle 10. Toggling of the check valves occurs in the time period T2. In the time period T1, the pressure signals generated by the intake strokes performed by the pistons in the internal combustion engine can be seen as a function of the rotational speed. In the time period T2, the toggling of the check valves can be seen from the regions in which the pressure level is maintained for a relatively long period after the switchover to the second introduction point, that is to say the frequency of the pressure signal described in T1 is not realized. In the time period T3, the pressure in the flush air line after the switchover to the second introduction point is free from the frequencies, discussed in the case of T1, resulting from the intake strokes.

In some embodiments, a detection is accordingly carried out as to whether the check valves arranged in the flush lines are situated in a toggling range. If this is the case, then the activation of the tank ventilation valve is reduced or deactivated in order to avoid undesired influences on emissions and driveability. In the case of an exact detection of the toggling range by means of an evaluation of the intake pipe pressure gradient, an adaptation of the flushing rate is performed only if necessary. An adaptation of the tank ventilation valve control is performed only in the presence of undefinedly activated flush lines. This leads to an improvement in the overall flushing rate.

Since the evaluation for the detection of the toggling range is based on an evaluation of the intake pipe pressure gradient, which behaves independently of aging and an associated decrease in the performance of the Venturi nozzle, the described procedure can take place without an adaptation of the differential pressure generated by the Venturi nozzle.

LIST OF REFERENCE DESIGNATIONS

1 Fuel tank
2 Activated carbon filter
3 Tank ventilation valve
4 First check valve
5 Second check valve
6 First flush line
7 Second flush line
8 Double check valve
9 Air filter
10 Venturi nozzle
11 Compressor
12 Throttle flap
13 Internal combustion engine
14 Engine controller
15 Branching point
S1 Pressure sensor
S3 Pressure sensor
S4 Pressure sensor
S6 Pressure sensor
S6' Pressure sensor
S7 Lambda sensor
p1 Intake pipe pressure at the inlet of the internal combustion engine
p2 Pressure downstream of the compressor (modeled)
p3 Charge pressure upstream of the throttle flap
p4 Ambient pressure
p5 Pressure upstream of the compressor (modeled)
p6 Tank system pressure
st1 Control signal for the tank ventilation valve
st2 Control signal for the injection valves

What is claimed is:

1. A method for controlling a tank ventilation valve connected to an intake tract of a turbocharged internal combustion engine via two flush lines, wherein each of the two flush lines includes a respective check valve, the method including:
checking whether the respective check valves are in a toggling range; and
if the respective check valves are in the toggling range, at least partially closing the tank ventilation valve.

2. The method as claimed in claim 1, wherein checking whether the respective check valves are in the toggling range includes evaluating pressure sensor signals.

3. The method as claimed in claim 2, wherein checking whether the respective check valves are in the toggling range includes evaluating pressure sensor signals provided by a pressure sensor measuring intake pipe pressure at an inlet of the internal combustion engine.

4. The method as claimed in claim 3, wherein checking whether the respective check valves are in the toggling range includes evaluating a pressure gradient of the pressure sensor signals.

5. The method as claimed in claim 4, wherein the toggling range corresponds to a calculation that the pressure gradient is smaller than a predefined first threshold value.

6. The method as claimed in claim 5, wherein the predefined first threshold value comprises an empirically ascertained constant.

7. The method as claimed in claim 5, further comprising checking whether the respective check valves are in the toggling range in response to successive pressure sensor signals within a predefined pressure range and deviating from a reference pressure by less than a predefined second threshold value.

8. The method as claimed in claim 7, wherein the predefined second threshold value comprises an empirically ascertained constant.

9. The method as claimed in claim 2, wherein checking whether the respective check valves are in the toggling range includes evaluating pressure sensor signals from a pressure sensor measuring a tank system pressure.

10. The method as claimed in claim 9, wherein checking whether the respective check valves are in the toggling range includes evaluating a frequency and amplitude of the pressure sensor signal.

11. The method as claimed in claim 10, further comprising determining a frequency of intake strokes of the internal combustion engine.

12. The method as claimed in claim 10, further comprising identifying the toggling range if the amplitude of the pressure signal constantly alternately assumes a first or a second value;
wherein the first value of the amplitude of the pressure signal corresponds to a pressure at an outlet of the first flush line; and
the second value of the amplitude of the pressure signal corresponds to a pressure at an outlet of the second flush line.

13. A device for controlling a tank ventilation valve which is connected to the intake tract of a turbocharged internal combustion engine via two flush lines, the device comprising:
an engine controller programmed to:
check whether the respective check valves are in a toggling range; and
if the respective check valves are in the toggling range, direct at least partial closure of the tank ventilation valve.

* * * * *